Feb. 24, 1953 — A. C. BODY — 2,629,805

METHOD AND MEANS FOR BUTT WELDING

Filed Feb. 28, 1950 — 2 SHEETS—SHEET 1

INVENTOR.
Alfred C. Body

Feb. 24, 1953    A. C. BODY    2,629,805
METHOD AND MEANS FOR BUTT WELDING
Filed Feb. 28, 1950    2 SHEETS—SHEET 2

INVENTOR.
Alfred C Body

Patented Feb. 24, 1953

2,629,805

UNITED STATES PATENT OFFICE 2,629,805

METHOD AND MEANS FOR BUTT WELDING

Alfred C. Body, Cleveland, Ohio, assignor to The Ohio Crankshaft Company, Cleveland, Ohio, a corporation of Ohio Application February 28, 1950, Serial No. 146,887

14 Claims. (Cl. 219—10)

This invention pertains to the art of welding and, more particularly, to the heating of large-area surfaces preparatory to welding same.

In the copending applications of F. S. Denneen, Serial No. 146,828 filed February 28, 1950, and Serial No. 146,829 filed February 28, 1950, there was disclosed method and apparatus for the heating of large-area surfaces preparatory to welding these surfaces. In one of the embodiments of the invention, the surfaces were disposed in slightly-spaced and opposed relationship. A high-frequency electric conductor surrounded the members adjacent the surfaces and supplied a source of external heat. The members were electrically interconnected centrally of the surfaces to be welded and a low-frequency or direct current was passed longitudinally of the members through this electrical interconnection. Electrical-resistance heat provided a source of heat interiorly of the members, aiding in the heating remote from the external inductor and providing a much more even temperature gradient across the surfaces to be welded. This embodiment of the invention relied on conduction of heat from the two heat sources to the portions of the surface intermediate these two sources.

The present invention contemplates disposing the surfaces in the same slightly-spaced opposed relationship with an electrical connection between the surface and centrally disposed with respect thereto. However, the present invention contemplates generating electrical-resistance heat only and directly in and across the entire surfaces to be heated.

Accordingly, an object of the present invention is the provision of new and improved methods and apparatus for efficiently, rapidly and evenly heating a pair of large-area, slightly-spaced and opposed surfaces which is simple in operation, readily controlled and which eliminates the drawbacks of the prior art.

Another object of the invention is to utilize the skin effect of high-frequency currents to heat the surfaces directly by passing such currents radially over the surfaces but in opposite directions on each surface whereby to generate heat solely on the surface itself.

Another object is the provision of means and method for insuring that the radial currents will be evenly distributed and equal around the entire periphery of the surface.

Another object is to heat the surfaces by flowing high-frequency electrical currents therein in a radial direction and compensating for the greater heat generated in the center of the surfaces by a second heat source adjacent the periphery of the surface.

Another object of the invention is the provision of a high-frequency inductor capable of flowing equal radial currents in the surfaces and, at the same time, generating currents to flow circumferentially of the members.

Another object is to provide a method of eliminating or breaking up the oxides or other film which may form on the surfaces to be welded either before or during the heating operation.

Generally speaking, the invention comprises positioning the surfaces to be heated in a slightly-spaced but opposed relationship with a member electrically connecting the surfaces disposed centrally thereof and then passing high-frequency currents radially across the surfaces in opposite direction, using the interconnecting member as a return path until the surfaces are heated to the welding temperature. If the heat generated radially innermost on the surfaces is too great due to the inherent concentration of current there, then an external high-frequency inductor adapted to flow high-frequency currents circumferentially of the members to be welded may be provided. A coaxial conductor may surround the members and extend across the joint to provide the electrical connection to one of the members and insure that the radial currents will be equally distributed in a circumferential direction. This connector may have longitudinal slots to permit the flow of a flux from the circumferentially-extending conductor, if necessary.

The invention is embodied in certain methods and steps and parts and arrangement of parts, a preferred embodiment of which is described in this specification and illustrated in the accompanying drawing which forms a part hereof, and wherein.

Figure 1:
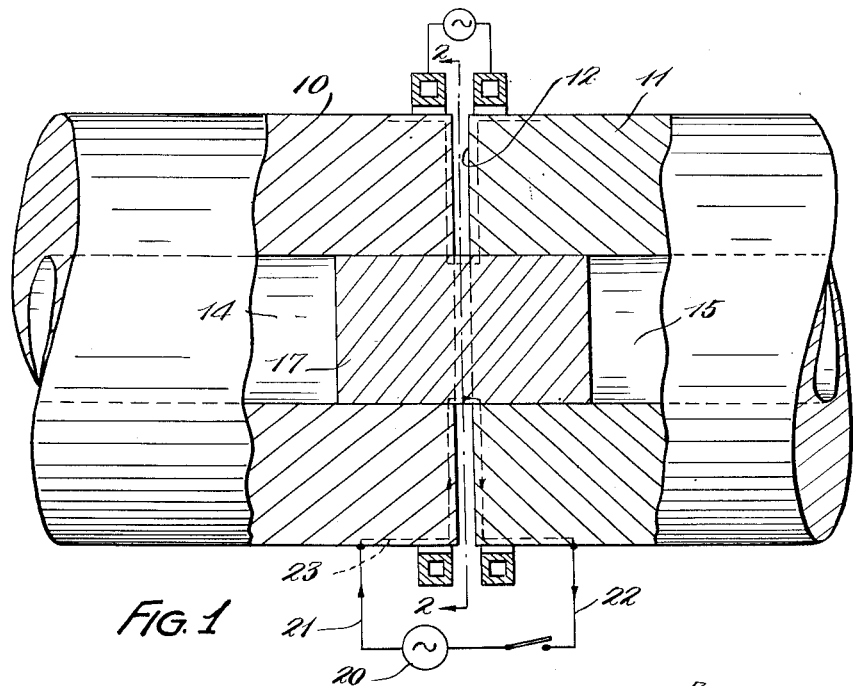
Figure 1 shows a pair of members having surfaces to be heated using apparatus and methods embodying the present invention.

Referring now to the drawings wherein preferred embodiments of the invention are shown for the purposes of illustration only and not for the purposes of limitation, Figure 1 shows a pair of substantially identical tubular members 10, 11 having surfaces 12 to be heated to the welding temperature and subsequently brought into pressure engagement by any suitable means not shown to effect a complete and homogeneous weld. In the embodiment of the invention shown, the members 10, 11 each have a bore or aperture 14, 15 respectively centrally located in the surfaces 12. The invention is adapted for any type of electrically-conducting material such as steel or the like.

The surfaces 12 should preferably be flat and parallel and are shown in slightly-spaced relationship. The members 10, 11 are electrically interconnected by means of a plug 17 having a diameter substantially equal to the diameter of the aperture or bore 14, 15, and this plug extends a suitable distance into either bore and its outer surface makes electrical contact with the surfaces of the bores. The above is similar to the arrangement of the members and plug shown in the first above referred to application of Denneen. Obviously, if desired, the plug may be tapered and the ends of the bores tapered as is shown in that application. Alternatively, the members 10, 11 may be solid and electrically interconnected by a boss on one member extending into an aperture on the other member as shown in the second referred to application.

As stated, the above referred to applications contemplate flowing a low-frequency or direct current longitudinally of the members whereby an electrical-resistance heating action would occur either directly in the plug or in the contacting surfaces between the plug and the bore.

The present invention contemplates flowing a high-frequency electric current longitudinally between the members 10, 11. It is preferred that the frequency of this current be high enough such that the so-called "skin effect" will be present and the currents will flow only at or near the surfaces of the members. Thus, in Figure 1, a source 20 of a high-frequency current is shown having its terminals connected by any suitable means including wires 21, 22 each to one of the members 10, 11. As the members 10, 11 are electrically connected by the plug 17, high-frequency electrical currents will flow between the members 10, 11 through the plug. However, in contradistinction to when low-frequency or direct currents are used, the high-frequency currents will flow only in the surfaces of the members. Thus, a current path 23 will exist as shown in dotted lines in Figure 1, which current path will flow from the point of connection of the conductor 21 longitudinally along the surface of the member 10 until it reaches the surface 12 of the member 10. At this point, the currents will flow radially inwardly along the surface 12 until it reaches the plug 17 at which point it will flow along the surface of the plug 17 disposed between the planes of the surfaces 12. Then, the current will flow radially outwardly on the surface 12 of the member 11 until it reaches the outer portion of the member 11 from whence it will flow longitudinally along the outer portions of the member 11 to the point where the conductor 22 is connected thereto. The total current may be of an extremely high value, approaching or exceeding 1,000 to 5,000 amperes. The currents flow in opposite directions on the two surfaces, thus further tending to concentrate the currents at the surface. It will be appreciated that current of this magnitude flowing at a relatively limited depth in the surfaces 12 will, obviously, rapidly heat same.

Figures 2, 4:
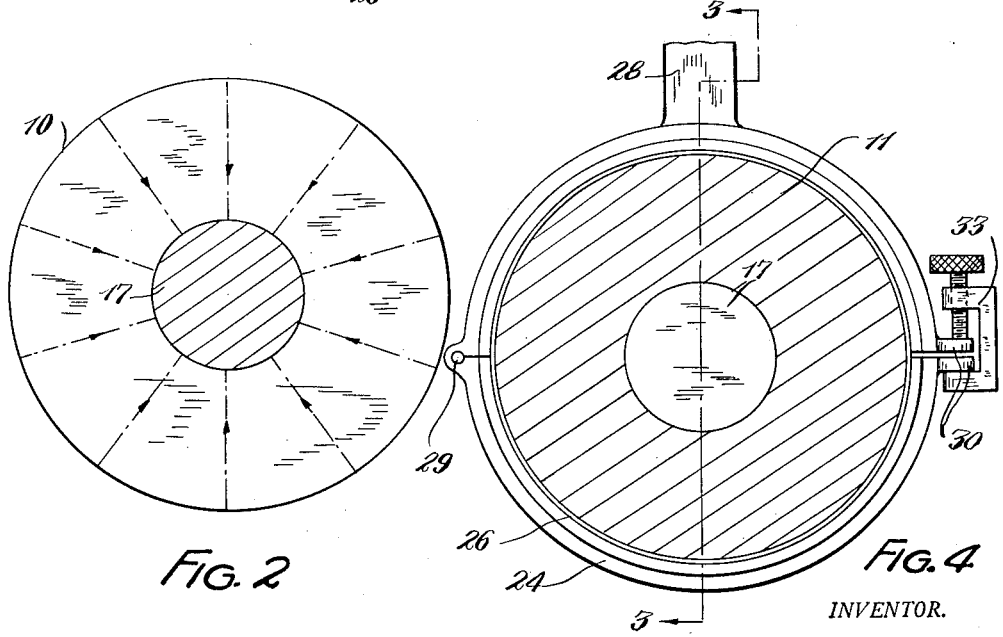
Figure 2 is a sectional view substantially on the line 2—2 of Figure 1 and showing the direction of flow of currents across one of the surfaces to be heated.
Figure 4 is a sectional view taken approximately on the line 4—4 of Figure 3.

It is preferred that the method of connecting conductors 21 and 22 to the members 10, 11 respectively be such that the currents 23 circumferentially around the members be of equal magnitude or of equal distribution. Assuming equal current distribution around the outer surfaces of the members 10, 11, Figure 2 shows schematically the current distribution in one of the surfaces 12. It will be noted that as the current progresses radially inwardly, the current distribution or density becomes greater. Thus, there will be an increased amount of heating inwardly of the members away from the exterior surfaces. Also, the plug 17 will become heated by the flow of current thereto. The heat of this plug will flow to the members 10, 11 by conduction.

If the heat differential between the outer portions of the surfaces 12 and the inner portions thereof becomes too great, an external source of heat may be provided. In the embodiment of the invention shown in Figure 1, a high-frequency inductor of conventional structure similar to that shown in the applications of Denneen may be employed.

The members 10, 11 may be of solid bar stock with a small projection on one surface or an insert to space the members. Alternatively, one or both surfaces may be formed with a spherical surface of large diameter and the surfaces may be at an angle to the axis if desired.

Thus, it will be seen that a method of heating the surfaces has been provided which heats substantially only the surfaces which it is desired to weld and which, contrary to former experiences, tends to heat the surfaces remote from the outer edges thereof, which differential in heating may be compensated for by an external high-frequency inductor.

Figure 3:
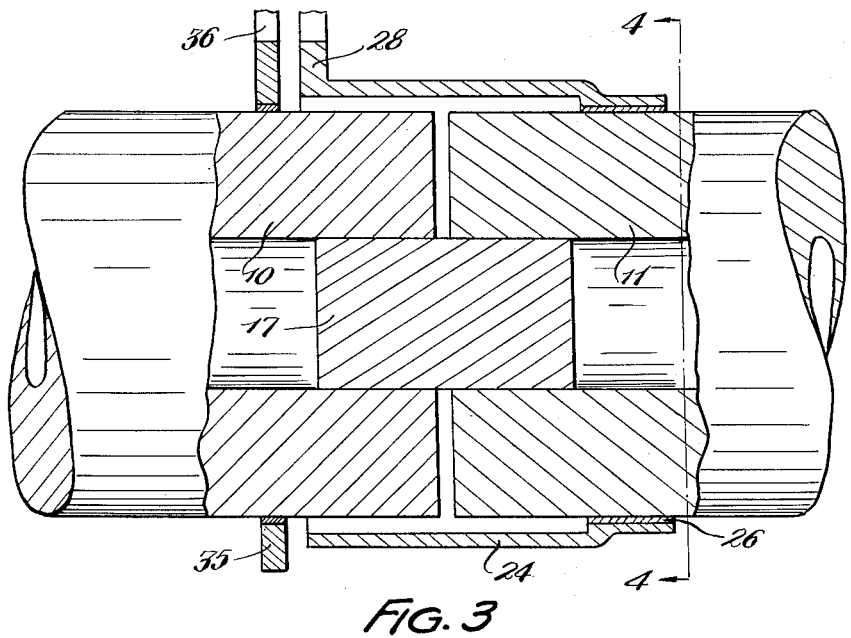
Figure 3 is a view similar to Figure 1 and showing a preferred method of making the electrical connections to one of the members whereby to insure equal circumferential distribution of the radial currents in the surface.

Figures 3 and 4 show a preferred method of introducing the high-frequency currents into the members 10, 11 whereby to obtain an equal circumferential distribution of current around the members 10, 11 and over the surfaces 12, as well as to maintain the currents along the outer surfaces of the members 10, 11. In this embodiment, a sleeve 24 of a copper or other electrically-conducting material extends in closely-spaced relationship to the outer surfaces of the members 10, 11 and on both sides of the surfaces 12. On the right-hand end, the sleeve 24 is reduced slightly in diameter and makes electrical contact with the outer surface of the member 11. If desired, a soft silver shoe 26 may be provided on the inner side of this portion of reduced diameter to provide an improved electrical contact with the member 11. The left-hand end of the sleeve 24 has a suitable fish-tail lead 28 which may connect to the terminals of some suitable high-frequency power source, including an impedance matching transformer.

The sleeve 24 shown is formed in two semi-circular sections pivoted relative to each other as at 29 and each provided with a longitudinally-extending flange 30 on the opposite side, which flanges may be held in abutting relationship by suitable means such as the clamp 33. Such a construction enables the sleeve 24 to be readily installed in position relative to the members 10, 11 prior to the welding operation and readily removed subsequent thereto.

The member 10 may have a connecting ring 35 clamped thereto, which ring may have a fishtail connection 36 extending radially therefrom and in parallel close relationship with the fish tail 28.

The point of connection of the sleeve 24 and ring 35 to their respective members should be sufficiently far removed from the surfaces 12 so that they do not conduct away an undue amount of heat from the surfaces and so that upsetting of the heated metal during the pressure welding may occur. Also, these members must generally be water cooled.

Figure 5:
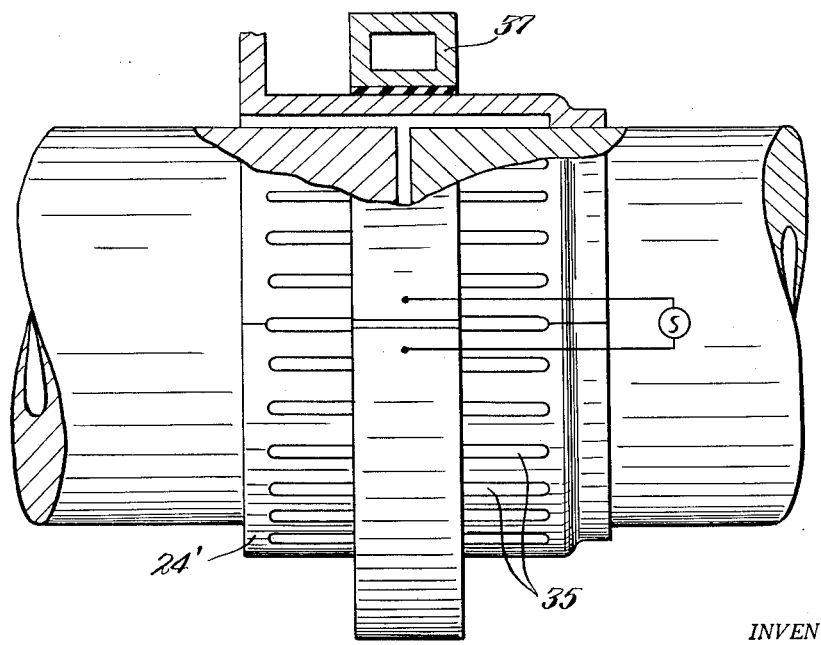
Figure 5 is a side elevational view partly in section of an inductor capable of carrying out the methods of and embodying the present invention.

As pointed out above, it may be desirable to provide a circumferentially-extending inductor around the members to provide additional heat adjacent the outer surface thereof. If such an inductor were provided with the sleeve 24, the flux lines of the circumferentially-extending inductor could only flow with some difficulty. The present invention contemplates an inductor and sleeve arrangement whereby the flux in the circumferentially-extending conductor may thread through the outer surfaces of the members 10, 11 without interference by the sleeve 24. An inductor embodying this phase of the invention is shown in Figure 5. Here, the sleeve, indicated by 24' for the purposes of convenience, has a plurality of longitudinally-extending, circumferentially-spaced slots extending through its wall. Surrounding the sleeve 24', a conventional one-turn, circumferentially-extending inductor 37 is shown. This inductor is split at one point and the conventional fish-tail connections (not shown) may be made here. It will be seen that the flux lines of the inductor may thread through the slots into the surfaces of the members 10, 11, thus generating circumferentially-extending currents in the surfaces of the members 10, 11. These currents provide a heating source on the exterior surfaces which will serve to compensate for and equalize the heating across the surfaces 12. The inductor 37 could also be disposed interiorly of the sleeve 24' with the electrical connections thereto being made through suitable openings formed in the sleeve. Separate high-frequency power sources may be employed or a single source and separate impedance transformers.

Obviously, the degree of heating from the radial currents and from the circumferential currents may be readily controlled by controlling the power input to the inductor 37 and the surface 12.

The plug 17 may be made of any desired material but, in this invention, it is preferred that it be made from a material similar to that of the material in members 10, 11. It will also be appreciated that the plug could be made integral with one of the members by machining away the portions of the surfaces 12 surrounding it. Such a construction is shown in greater detail in the second referred to application of Denneen.

In some instances, oxides or the like may form on the surfaces 12 which will prevent the uniting and fusion of the metal of the surfaces such as to give a weld of desired strength. This oxide surface may be broken up to a sufficient degree so as not to interfere with the character of the weld by rapidly rubbing the surfaces together during the heating operation as by rotating the members 10, 11 on a common axis but in opposite directions relative to each other. With the members rotating, the surfaces 12 are then brought into physical contact and allowed to rub against each other. During this rubbing operation, it is preferred that the high-frequency currents from the source 20 be turned off so as to avoid arcing or the like between the surfaces. This rubbing of the surfaces may, if desired, be the first step prior to turning on the high-frequency heating currents from the source 20. It may be continued as desired either continuously or intermittently. Preferably, as the metal surfaces become heated to the plastic state, the rubbing is stopped or slowed. The point at which the rotation should be stopped may be determined by the power required to rotate the two members. As the metal reaches the temperature at which the welding commences to occur, the power required to cause the rotation will commence to increase, thereby accurately indicating this point.

Thus, it will be seen that an embodiment of the invention has been described which accomplishes the objects heretofore set forth and others. Alterations and modifications will occur to others upon a reading and understanding of this specification and it is my intention to include all such modifications and alterations insofar as they are within the scope of the appended claims.

Having thus described my invention, I claim:

1. The method of heating a pair of generally cylindrical surfaces on metallic members preparatory to butt welding same comprising placing the surfaces in slightly-spaced opposed relationship, providing an electrical interconnection between said surfaces centrally thereof and flowing high-frequency electric currents radially over said surfaces.

2. The method of claim 1 wherein high-frequency electric currents are also flowed circumferentially around the edges of the surfaces.

3. The method of claim 1 including the additional step of moving said surfaces into pressure-abutting relationship when they have reached the desired welding temperature.

4. The method of heating surfaces on a pair of generally cylindrical metallic members prior to pressure welding the same comprising positioning said surfaces in slightly-spaced opposed relationship, providing an electrical interconnection centrally of said surfaces and flowing high-frequency electric currents coaxially with said members from one side of said surfaces to the other side of said surfaces and thence radially over said surfaces.

5. The method of heating surfaces on a pair of generally cylindrical metallic members prior to the pressure welding of same comprising placing said surfaces in slightly-spaced opposed relationship and flowing high-frequency currents coaxially adjacent and across the edges of said surfaces from one side to the other, thence across each of said surfaces radially.

6. The method of heating close-spaced generally circular surfaces on metallic members comprising flowing high-frequency currents radially across said surfaces from the periphery toward the center with the direction of currents flowing at any one instant in the respective surfaces being in opposite directions.

7. The method of claim 6 wherein high-frequency currents are also flowed circumferentially along the edges of said surfaces.

8. An inductor for heating surfaces of metallic members prior to butt welding same, said inductor including a generally cylindrical conductor adapted to fit around said members and extend on both sides of said surfaces, said conductor having a plurality of circumferentially-spaced, longitudinally-extending openings therethrough and a second conductor extending circumferentially of said first conductor and in insulated relationship thereto.

9. An inductor for heating opposed surfaces of generally cylindrical metallic members prior to butt welding same, said inductor comprising a sleeve-like conductor adapted to fit around said members and extend on both sides of said surfaces, said conductor having at one end an arrangement for making electrical connection with the external surface of one of said members and at the other end an arrangement for making connection with a high-frequency power source, said conductor having a plurality of spaced openings therethrough, and a second conductor extending circumferentially with relation to said first conductor and adapted to be disposed opposite the surfaces to be welded.

10. The method of heating a generally plane metallic generally circular surface comprising flowing high-frequency currents across said surface from the periphery thereof toward a central point, the density of the currents being generally uniform in a circumferential direction but increasing in a radial direction toward said central point.

11. The method of welding the surfaces on a pair of metallic members which comprises relatively rotating said surfaces while in abutting engagement at a relatively high rate to break up any oxide or other films formed thereon and simultaneously applying heat to said members to heat said surfaces to the welding temperature.

12. The method of claim 11 wherein as said surfaces approach the plastic temperature, the rotation is stopped and the heating is continued until the desired welding temperature is reached.

13. The method of heating a pair of generally cylindrical surfaces on metallic members preparatory to butt welding same comprising placing the surfaces in slightly-spaced opposed relationship, providing an electrical interconnection between said surfaces centrally thereof and flowing high-frequency electric currents radially over said surfaces while simultaneously flowing high-frequency electric currents circumferentially around the edges of said surfaces and then moving said surfaces into pressure-abutting relationship when they have reached the desired welding temperature.

14. The method of welding the surfaces on a pair of metallic members which comprises bringing said surfaces generally into pressure engagement, moving said surfaces relatively to each other in the plane of said surfaces at a sufficient rate to break up any oxide or other film formed thereon and applying heat to said member to heat the surfaces.

ALFRED C. BODY.

REFERENCES CITED

The following references are of record in the file of this patent:

UNITED STATES PATENTS

| Number | Name | Date |
|---|---|---|
| 1,270,860 | Newcomb | July 2, 1918 |
| 2,014,082 | Fox | Sept. 10, 1935 |
| 2,066,668 | Bennett | Jan. 5, 1937 |
| 2,144,377 | Kennedy | Jan. 17, 1939 |
| 2,205,425 | Leonard | June 25, 1940 |
| 2,222,906 | Hentzen | Nov. 26, 1940 |
| 2,415,912 | Scherl | Feb. 18, 1947 |
| 2,455,136 | Obert | Nov. 30, 1948 |
| 2,480,299 | Klinke | Aug. 30, 1949 |